(12) United States Patent
Ferrara et al.

(10) Patent No.: US 8,965,927 B2
(45) Date of Patent: Feb. 24, 2015

(54) MANAGING FACILITIES

(75) Inventors: Raymond Ferrara, Concord, MA (US); Brian Underwood, Cranston, RI (US)

(73) Assignee: RBM Technologies, Cambridge, MA (US)

(*) Notice: Subject to any disclaimer, the term of this patent is extended or adjusted under 35 U.S.C. 154(b) by 0 days.

(21) Appl. No.: 13/194,242

(22) Filed: Jul. 29, 2011

(65) Prior Publication Data
US 2012/0054242 A1 Mar. 1, 2012

Related U.S. Application Data
(60) Provisional application No. 61/369,379, filed on Jul. 30, 2010.

(51) Int. Cl.
*G06F 15/16* (2006.01)
*G06F 17/30* (2006.01)
*G06Q 50/16* (2012.01)
*G06Q 10/06* (2012.01)

(52) U.S. Cl.
CPC .............. *G06Q 50/163* (2013.01); *G06Q 10/06* (2013.01)
USPC ................... 707/783; 709/217; 707/E17.005; 707/E17.032

(58) Field of Classification Search
USPC ......................................................... 707/783
See application file for complete search history.

(56) References Cited

U.S. PATENT DOCUMENTS

| | | | |
|---|---|---|---|
| 6,026,377 A | 2/2000 | Burke | |
| 6,191,850 B1 | 2/2001 | Chiang | |
| 6,427,132 B1 * | 7/2002 | Bowman-Amuah | 703/22 |
| 7,124,101 B1 * | 10/2006 | Mikurak | 705/35 |
| 2005/0203790 A1 | 9/2005 | Cohen | |
| 2006/0161465 A1 | 7/2006 | Ramakrishnan | |
| 2006/0265489 A1 * | 11/2006 | Moore | 709/223 |
| 2007/0061211 A1 * | 3/2007 | Ramer et al. | 705/25 |
| 2009/0059270 A1 | 3/2009 | Opalach et al. | |
| 2009/0119305 A1 * | 5/2009 | Johnson et al. | 707/10 |
| 2010/0010968 A1 * | 1/2010 | Redlich et al. | 707/3 |
| 2010/0138037 A1 * | 6/2010 | Adelberg et al. | 700/241 |
| 2011/0295764 A1 | 12/2011 | Cook et al. | |
| 2012/0296777 A1 | 11/2012 | Fugman et al. | |
| 2013/0006790 A1 | 1/2013 | Raskin et al. | |
| 2013/0076726 A1 | 3/2013 | Ferrara | |

OTHER PUBLICATIONS

Toung, DH Wal-Mart Stores, Inc.—Company Report, Dec. 8, 1997.

* cited by examiner

*Primary Examiner* — Shyue Jiunn Hwa
(74) *Attorney, Agent, or Firm* — Fish & Richardson P.C.

(57) ABSTRACT

One or more servers perform functions that include: maintaining a database including information relating to facilities that are subject to a first entity, the facilities being dispersed geographically, the information including geographic locations for at least some of the facilities; receiving a first message from a facility for which information is in the database, the first message identifying a fixture of the facility that requires attention, where information in the database for the facility identifies the fixture by at least one of a designation of the fixture and a characteristic of the fixture; sending a second message to a second entity that has contracted with the first entity to provide service within a geographic location of the facility; and enabling the second entity to access the database to identify the fixture.

24 Claims, 17 Drawing Sheets

```
OOO   1080_HQ_technologies_national_retailer_Independent_Concord – Locations: Floorplan (RBM Visual Merchandising Manager)
◀ ▶  ↻ ✕ ⌂   ( rbmfrontline.com  ( https://                                                    ☆▼
Back Forward Reload Stop Home
O2 O2 Stage RBM                                          Locations (RBM Vis...  Harris   Harris PHP   RBM
TEMPLATE_MASTER_10..⊗ Filters (RBM Visual Mer..⊗ Filters (RBM Visual Mer..⊗ 1080_HQ_technologies...⊗ TEMPLATE_MASTER_10..⊗

Home  Locations  Campaigns  Fixtures  Contents  Comments  Reference  Surveys  Reports  Announcements Filter: ( All Locations                        ⊕ )   Custom filter ☐ Select All
     ☐ National Retail (27)
     ☑ Next Gen / Location Specific (10)
     ☐ Kiosk (New) (37)
                                                               114
     ☐ General Maintenance (12)
     ☐ Multiple Store Type (37)
     ☐ Conventional (188)
     ☐ Next Gen (111)
     ☐ SOTF (49)
     ☐ Kiosk (Old) (25)
     ☐ Kiosk Solo (8)
     ☐ Kiosk Solo In-Line (15)
     ☐ Non-Retro/Mobility/Sample (95)
     ☐ Virgin Mobile (31)
     ☐ Floorplan Elements (27)
     ☐ Kiosk Solo Evolution (18)
     ☐ Atlantic (199)
     ☐ Celluland (1)
     ☐ Zed O2R (179)
                                              115
Merchandising: ( Any         ⊕ )
Issue Category: ( Any              ⊕ )
Issue Type: ( All Issues   ⊕ )
                      116
   ☐ Include resolved issues
                           117
   ☐ Sort by last comment
Bookmark as: [              ]
( Search )
```

FIG. 11

STAGING

Home  Locations  Campaigns  Fixtures  Contents  Comments  Reference  Surveys  Reports  Announcements Search: [       ]
Merchandising: (Any)
Issue Category: (Any)
☐ Display resolved issues
☐ Sort by last comment
(Search)

Displaying Issues for:
Fixtures — 121
- NG (FPO) Mobile Sect 2 of 2 - 611
- NG (FPO) Mobile (Sect 2) – 546
- NG FPO Mobile (Sect 2 of 2) – 348
- NG (FPO) Mobile (Sect 2 of 2) – 443
- NG (FPO) Mobile Sect 2 of 2 – 578
- NG Mobile 3 Panel Right Sect 1 of 2 – 577
- NG Mobile 4.5 Panel (Sect 1 of 2) – 349
- NG - Mobile 4 Panel (2Sect) – 435
- NG Mobile 4 Panel Sect 1 of 2 – 610
- NG Mobile 4 Panel (Sect 1) - 442

Download CSV — 126

| ID | Issue | Status | Fixture Type | | |
|---|---|---|---|---|---|
| View 30020 — 131 | Content Issue (POP/collateral/product) (Relevant Items: 24 Phone X) 02:39 PM, May 15, 2010 - bennison  The Phone X long out of stock. Why are we putting it on the wall? | In Progress Admin | NG Mobile 4 Panel (Sec 1) – 442 Elm Town Centre Next Gen Elm ON BC722 | 124 | 125 |
| View 30006 | Content Issue (POP/collateral/product) (Relevant Items: 210s SKU: 67469) 12:53 PM, May 15, 2010 - Frances  MOCK SKU: 67469 is on order but it is missing. | In Progress Admin | NG Mobile 4 Panel (Sec 1) – 442 Maple Town Centre Next Gen Smith ON BC722 | | |
| View 29709 | Content Issue (POP/collateral/product) (Relevant Items: MOCK SKU: 68525) 4:38 PM, May 10, 2010 - Teresa  Item has been ordered. | In Progress Admin | NG Mobile 4 Panel (Sec 1) – 442 Shopping Centre, Clinton, ON BC722 | | |
| | Floorplan Issue (walls/doors/windows) 4:37 PM, May 20, 2010  Andrew | | | | |

FIG. 12

| | https:// rbmfrontline.com/setup/categories/list/feedback/category |

File  Edit  View  Favorites  Tools  Help

★ Favorites | ★ Suggested Sites ▼

| Fixture_types (RBM Visual M... | Categories (RBM Visual Merc... | Categories (RBM Visual M... | Categories |

Locks/Keys/Cameras/etc. – Install new [Props] [Delete]

Plumbing – Flood [Props] [Delete]

Plumbing – Problem with Sink [Props] [Delete]

Plumbing – Problem with Toilet [Props] [Delete]

Security – Repair [Props] [Delete]

Signage – Exterior – Install new [Props] [Delete]

Signage – Exterior – Repair [Props] [Delete]

Signage – Exterior – Replace Bulb [Props] [Delete]

Signage – Interior – Repair [Props] [Delete]

Signage – Interior – Replace Bulb [Props] [Delete]

Walls / Doors – Paint [Props] [Delete]

Walls / Doors – Remove [Props] [Delete]

Walls / Doors - Repair [Props] [Delete]

Other Issues    200 [Props] [Delete]

+ Add New Category
[Delete All]
Reorder Categories
[Order By Name]

FIG. 15

MANAGING FACILITIES

CROSS-REFERENCE TO RELATED APPLICATION

This patent application claims priority to U.S. Provisional Application No. 61/369,379, which was filed on Jul. 30, 2010. The content of U.S. Provisional Application No. 61/369,379 is hereby incorporated by reference into this patent application as if set forth herein in full.

TECHNICAL FIELD

This patent application relates to managing facilities.

BACKGROUND

Companies often conduct business at many locations. This is particularly true of retailers, which can have stores located throughout the country. At different stores, problems can arise that require attention, such as servicing or repair. For example, an air conditioning system at a store in Boston may be in need of repair, or outdoor lighting at a location in San Diego may need to be replaced. Oftentimes, coordination of such service and repair is left in the hands of a local store manager. This can lead to problems. For example, there may be disparity in terms of how service and repair is handled, leading to an experience that is not consistent among stores. For many companies, this is undesirable. This is especially true for retailers and, in particular for chain stores, which try to make the shopping experience at their many locations as consistent as possible.

SUMMARY

This patent application describes methods and apparatus, including computer program products, for managing facilities.

Among other things, this patent application describes a system that performs operations which may comprise: maintaining a database comprising information relating to facilities that are subject to a first entity, where the facilities are dispersed geographically, and the information comprises geographic locations for at least some of the facilities; receiving a first message from a facility for which information is in the database, where the first message identifies a fixture of the facility that requires attention, and where information in the database for the facility identifies the fixture by at least one of a designation of the fixture and a characteristic of the fixture; sending a second message to a second entity that has contracted with the first entity to provide service within a geographic location of the facility; and enabling the second entity to access the database to identify the fixture. Any features described in this patent application may be incorporated into the foregoing system, examples of which are as follows.

The foregoing system may also comprise hosting a portal configured to enable messaging to one or more servers configured to implement the system. The first message may be received through the portal. The portal may be a Web page.

The foregoing system may also comprise hosting a portal configured to enable the second entity to access the database; and receiving a communication from the second entity, where the communication is for accessing the database to identify the fixture. The portal may be a Web page comprising a security feature to restrict access to the database.

The information in the database for the facility may identify the fixture by both a designation of the fixture and a characteristic of the fixture. The designation may comprise a part number and the characteristic may comprises a functionality associated with the fixture. The database may comprise information relating to entities that have contracted with the first entity to provide services for the facilities. The system may also comprise generating a report based on the information relating to the entities, where the report organizes the information relating to the entities; and providing the report to the first entity. The information relating to the entities may comprise at least one of responsiveness of the entities, costs of the entities, and capabilities of the entities.

The foregoing system may also comprise sending a third message to the second entity. The third message may be for confirming that the second entity provided the necessary attention to the fixture. Prior to receiving the first message, a reminder may be sent to the facility regarding an upcoming event associated with the fixture.

All or part of the systems and processes described herein may be implemented as a computer program product that includes instructions that are stored on one or more non-transitory machine-readable storage media and that are executable on one or more processing devices. Examples of non-transitory machine-readable storage media include e.g., read-only memory, an optical disk drive, memory disk drive, random access memory, and the like. All or part of the systems and processes described herein may be implemented as an apparatus, method, or electronic system that may include one or more processing devices and memory to store executable instructions to implement the stated functions.

Any two or more of the features described herein may be combined to form implementations not specifically described in this patent application.

The details of one or more examples are set forth in the accompanying drawings and the description below. Further features, aspects, and advantages will become apparent from the description, the drawings, and the claims.

DESCRIPTION OF THE DRAWINGS

FIGS. 7 to 17 are examples of user interfaces that may be part of the facilities management process depicted in FIGS. 1 to 4 and 6.

Like reference numerals in different figures indicate like elements.

DETAILED DESCRIPTION

Described herein is a system for managing facilities. A feature of the system includes a distinct fixture placed on a floorplan model of each location that is modeled by the system. Some implementations show this as a prominent fixture in the upper right or lower left of a floorplan display area, and typically label it a "General Maintenance" fixture. It is also possible to use different fixture types for different location types, or even to have more than facilities-related fixture on each floorplan.

Another feature of the system includes an administrator setup feature that allows multiple issues types to be related to each facilities-related fixture type. For each issue type, it is also possible to relate a specific user or user distribution list that should be notified when an issue of a particular type is reported. An advanced feature also permits each user distribution list to be further associated with a "location filter", so that it is possible to localize who will be notified when an issue is reported. For example, a certain user distribution list could be used for locations in one geographical or organization category (e.g. when the location's state is "Illinois", or the location's zip code is 12345 or the location is in Midwest region), while other user distribution lists may be used for other geographical or organizational categories.

Another feature of the system includes an issue/problem reporting and resolution process that allows store personnel to report an issue/problem and then have parties that receive the notifications escalate the issue for approval and/or resolve the issue.

Another feature of the system includes a set of issue tracking and resolution reports that allows company personnel to understand and measure compliance, coverage, and response times for each issue type. These facilities-manager-related reports are available on a reports tab and are generally restricted to administrative level personnel, although it is possible to allow other classes of personnel to see these reports.

The system described herein for managing facilities may be centralized in order to maintain relatively consistent management of facilities across different locations. FIGS. 1 to 4 depict the facilities management process conceptually. In this example, a central authority 10 maintains a database 11. Database 11 includes information about fixtures at facilities 12 to 15. These fixtures may include anything that requires attention (e.g., servicing, repair, replacement), including, but not limited to, windows, lighting, HVAC (heating, ventilating and air conditioning) systems, alarms, surveillance systems, parking lots, and roofs. The database may correlate the facilities to their fixtures, so that each fixture is associated with a facility.

Figure 1:
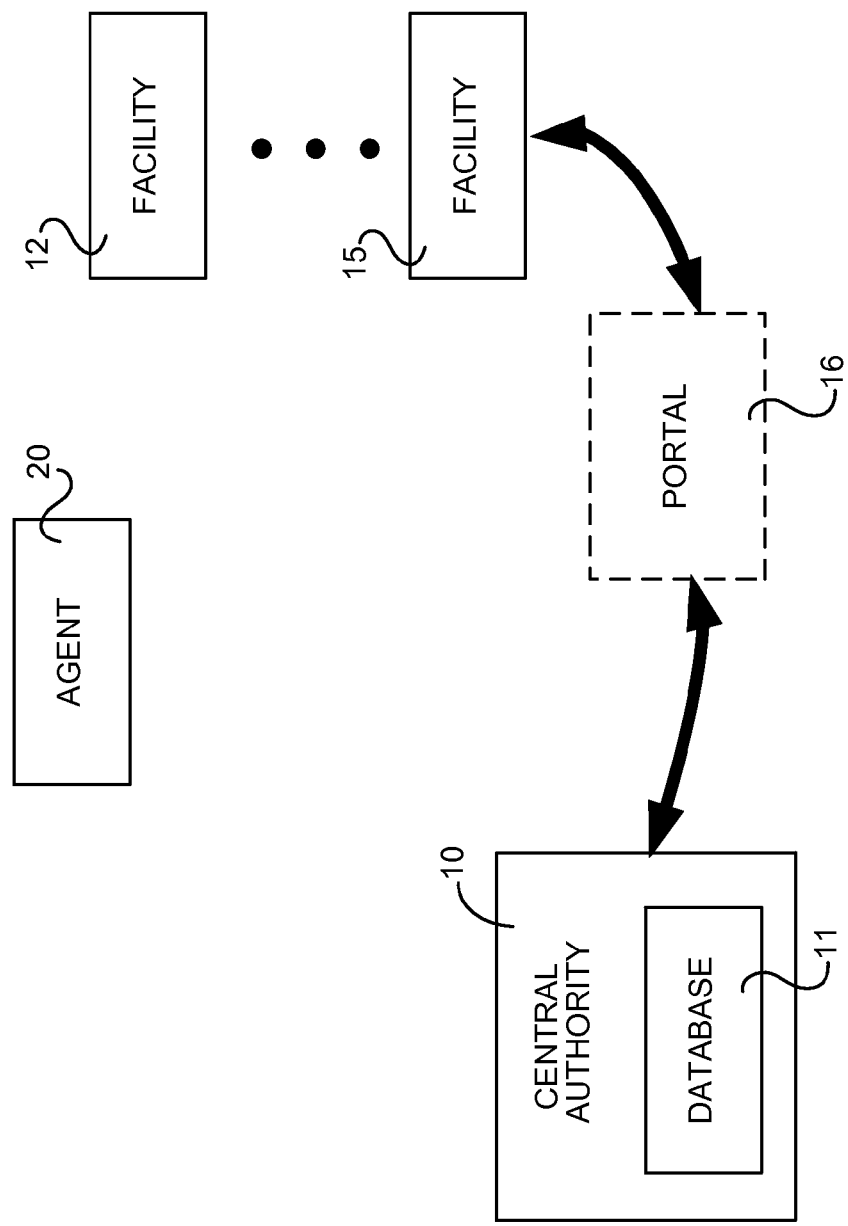
FIGS. 1 to 4 shows a facilities management process conceptually.
Figure 2:
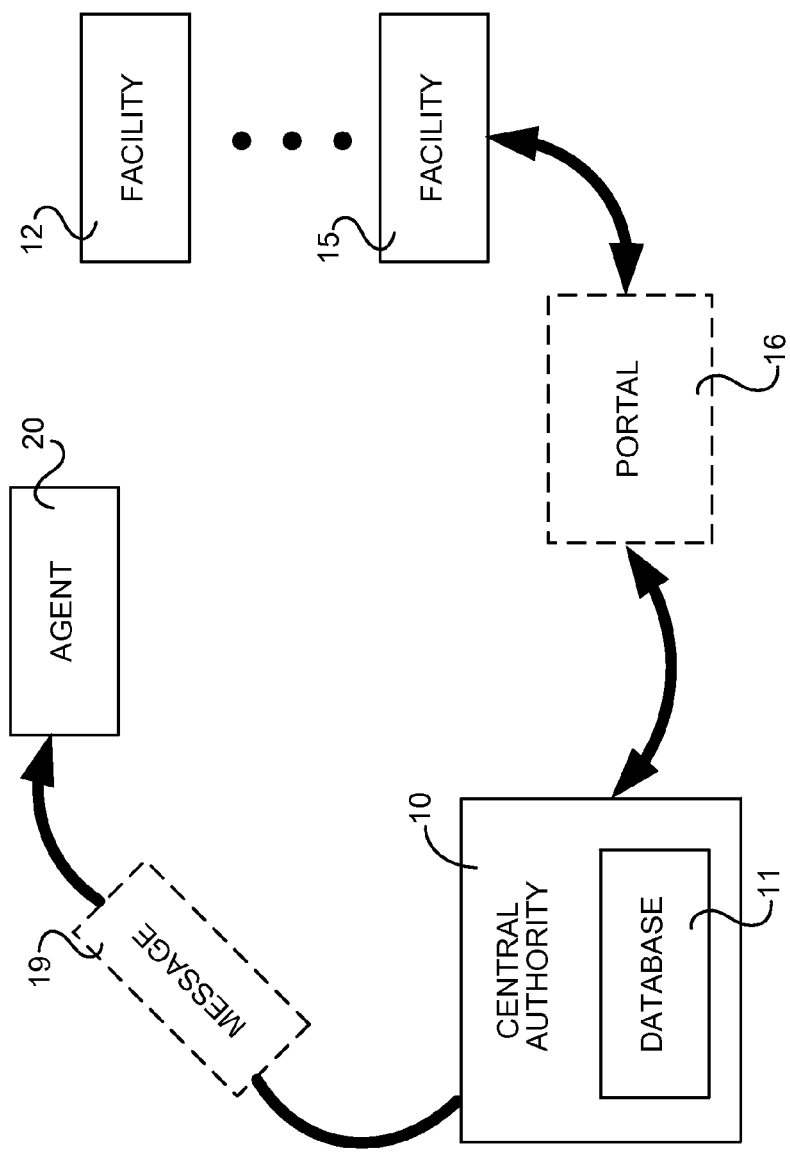
Figure 3:
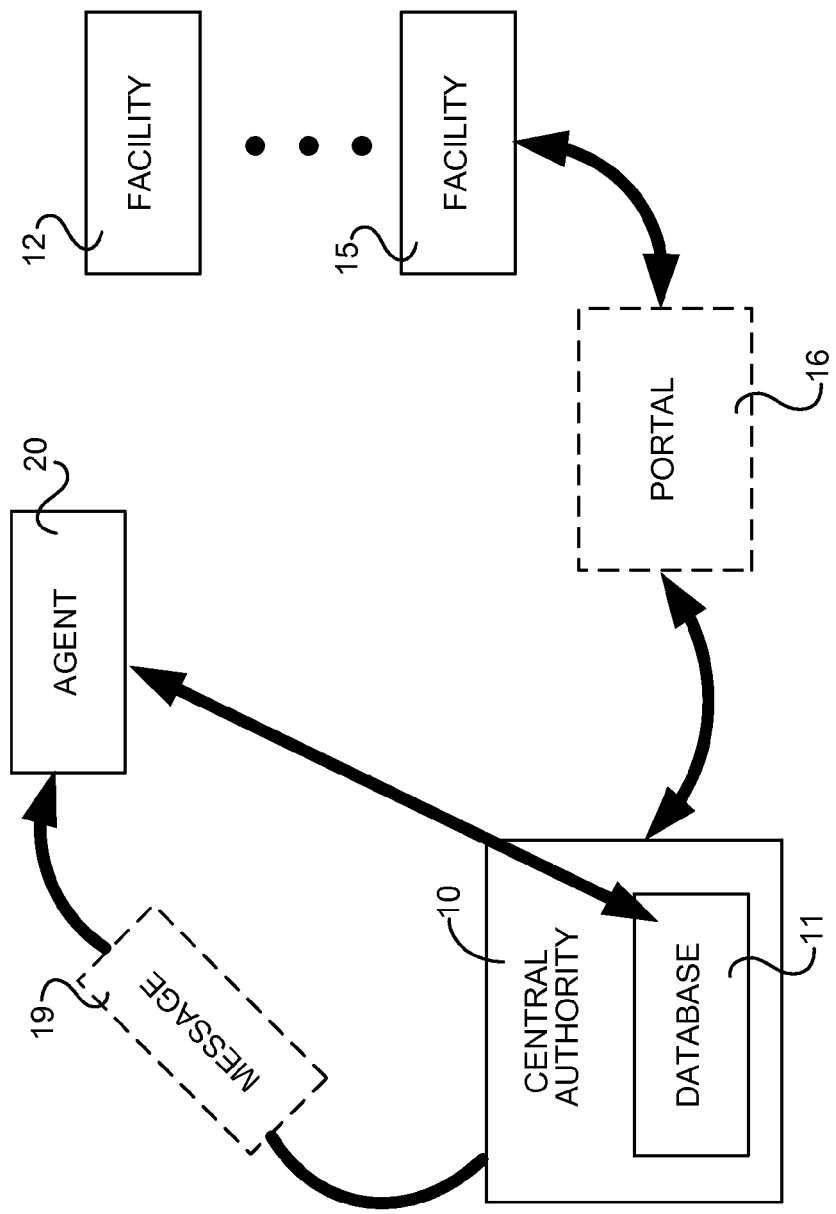
Figure 4:
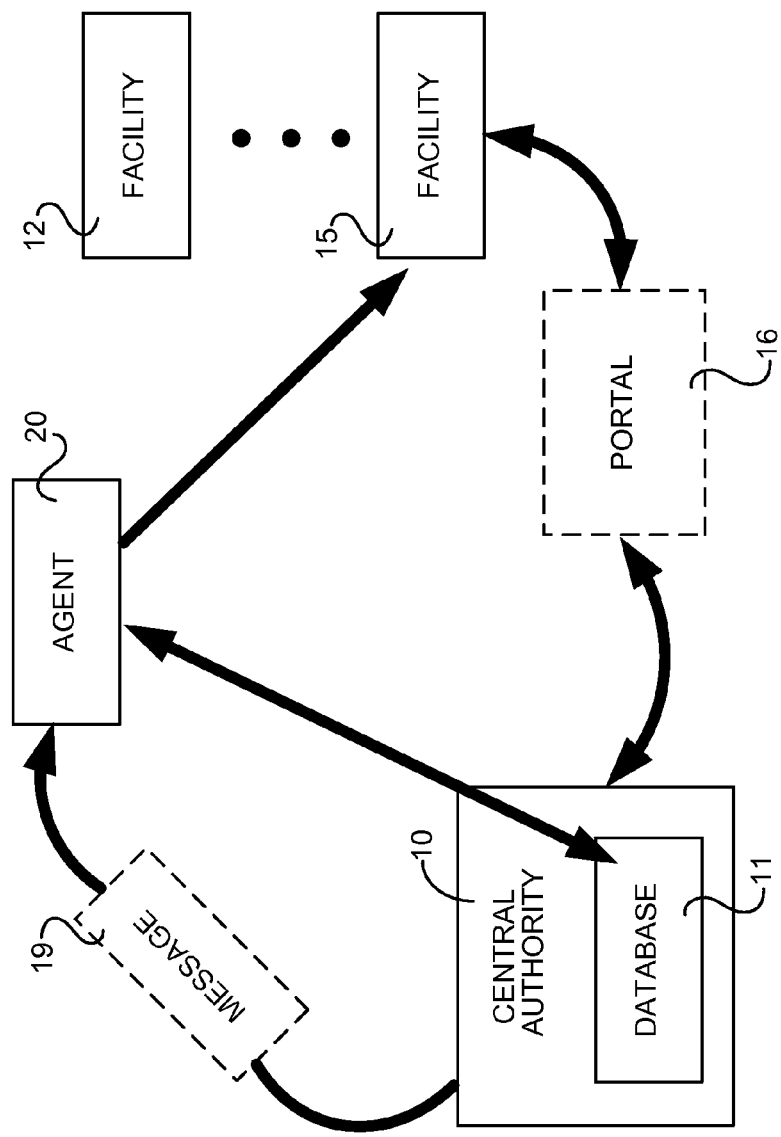

Referring to FIG. 1, central authority 10 hosts a portal 16, e.g., a Web page, which allows a facility (e.g., facility 15) to advise the central authority that there is an issue (e.g., a problem) with a fixture at the facility or to enable the central authority to send a reminder to the facility about an upcoming event (e.g., a warranty expiration or scheduled maintenance of a fixture at the facility). A user at the facility may identify the fixture through the Web page, along with information about the issue. The Web page provides the information to central authority 10. Referring to FIG. 2, in response to the information, central authority 10 may send a message 19 to an agent 20 with which the company that owns the facility has previously contracted. The message identifies the facility and the fixture that is in need of attention. Referring to FIG. 3, agent 20 may access database 11 to obtain information (e.g., a part number) about the fixture that is in need of attention. Referring to FIG. 4, agent 20 may then perform whatever actions are necessary to attend to (e.g., service, repair, replace) the fixture or a part thereof that needs attention.

Figure 5:
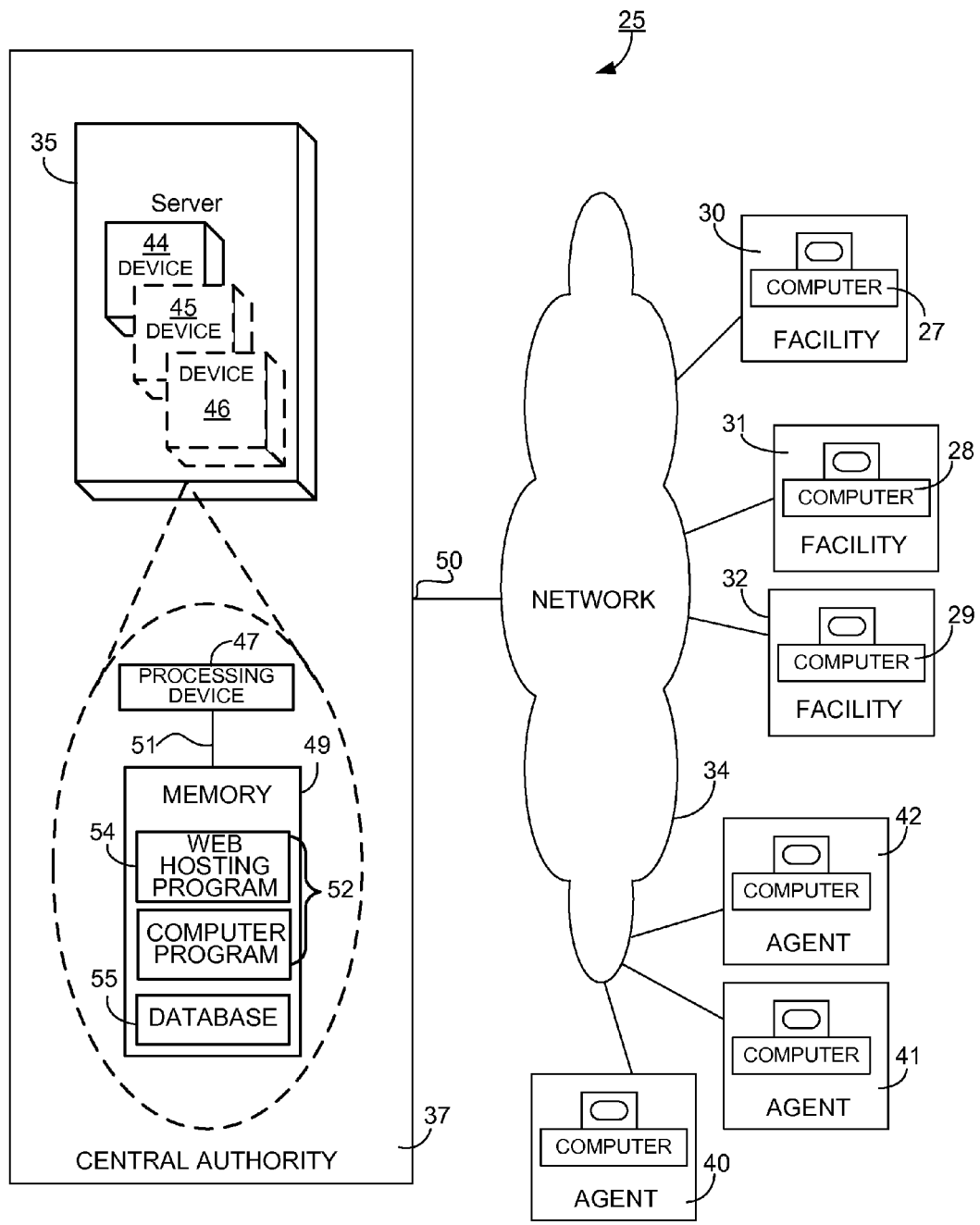
FIG. 5 shows a system on which the facilities management process of FIGS. 1 to 4 may be implemented.

FIG. 5 shows a system 25, on which the process depicted conceptually in FIGS. 1 to 4 may be implemented. System 25 includes computers 27 to 29 at corresponding facilities 30 to 32, a network 34, a server 35 at central authority 37, and network connections to various agents 40 to 42 with which companies that own the facilities have established contracts or that are otherwise available to attend to issues at the facilities. Each agent may also include one or more computers, as shown in FIG. 5.

Network 34 may include one or more networks, such as a local area network, a wide area network, and/or the Internet. One or more of the networks in network 34 may be wireless, such as a cellular telephone network and a Wi-Fi network.

As shown in FIG. 5, server 35 may include one computing device 44 or multiple computing devices 44 to 46 that are at a same location or at different locations (devices 45 and 46 are depicted using dashed lines since more than one device need not be used). Each of devices 44 to 46 may have the same, or similar, hardware and/or software configuration. In an implementation, devices 44 to 46 act together to perform various functions described herein. In other implementations, a single device may perform all of the server functions. In the case of multiple devices, device 44 may act as a controller or "load balancer" for the remaining devices 45 and 46. In this role, device 44 may route data, requests, and instructions between a client (e.g., computer(s) at facilities and/or computer(s) at agent(s)) and a "slave" device, such as device 46. Device 44 may store information locally, then route data to another device, such as device 46. For the purposes of the following, such internal communications between device 44 and slave devices will be assumed.

Server 35 includes a processing device 47, memory 49, and a network interface 50. A bus system 51, including, for example, a data bus and a motherboard, can be used to establish and control data communication between various components of server 35.

Generally speaking, processing device 47 may include any appropriate processor and/or logic that is capable of receiving storing and processing data, and of communicating over network 34. For example, processing device 47 may include one or more microprocessors. Memory 49 can include a hard drive and a random access memory (RAM) storage device, such as a dynamic random access memory (DRAM), or other type(s) of machine-readable medium memory devices.

As shown in FIG. 5, memory 49 stores computer programs 52 that are executable by processing device 47. Among these computer programs is a Web hosting program 54. Web hosting program 54 is executable to host a Web site that is accessible over network 34. The Web site may include a portal, through which users accessing the Web site can provide information to central authority 37. The information may include, e.g., the identity and location of a facility and the condition of one or more fixtures at the facility, as described below. The information entered into the portal constitutes a message to the central facility that a fixture or fixtures requires attention.

Server 35 also maintains a database 55. Database 55 may store, among other things, information about facilities, such as facilities 30 to 32. The information may include, but is not limited to, a geographic location of each facility, including its zip code, area code, street address, town/city, state/province, country, continent, time zone, and telephone number. The information may also include information identifying fixture(s) at each facility. A fixture may be anything at the facility, including those items that require attention, e.g., servicing, repair, and/or replacement. As noted above, fixtures may include, but are not limited to, windows, lighting, HVAC systems, alarms, surveillance systems, parking lots, and roofs. Also stored in database 55 is information about each fixture in the database. This information may include, but is not limited to, part number(s) for a fixture, a manufacturer of the fixture, a size of the fixture, a capacity of the fixture (e.g., volts, watts, volume), an origin of the fixture, a type of the fixture, a date that the fixture was manufactured, a location of the fixture at its facility, a cost of the fixture, acceptable alternatives to the fixture, and a color of the fixture. This list is not exhaustive, and the database may store any information that, e.g., describes or relates to each fixture in the database. The same types of information may, or may not, be stored for each fixture.

Database 55 may store information for different entities (e.g., companies) and their corresponding facilities. For example, the database may store information for Wal-Mart® and for its stores worldwide. The information that is stored may be the same for each company and for each facility owned by that company, or it may be different for each company and for each facility owned by that company. In an implementation, a company may specify which information is to be stored for that company and its facilities. In an alternative implementation, each facility may specify which information is to be stored for that facility.

Information may be input to database 55 via a Web site hosted by server 35. For example, an employee at a facility may survey the facility and input the relevant information into the database via the Web site. Alternatively, each facility may be surveyed by a specialist and the fixture information input to the database by the specialist. The specialist may be an employee of a proprietor of the database.

Database 55 associates fixtures and their information to corresponding facilities. For example, database 55 may store information for retail locations owned by a company. We present the following example with a fictitious company called ABC Corporation. ABC Corporation may have retail locations (e.g., facilities) in Boston, New York, Los Angeles and London, UK. Database 55 may store information for each retail location of ABC Corporation, and associate that information to ABC Corporation. Database 55 may also store, in association with each facility (and ABC Corporation) the identities of one or more agents that have been contracted to attend to fixtures at each facility. For example, ABC Corporation may have service contracts with agent(s) nearby each facility, which are capable of servicing, repairing and/or replacing fixture(s) at the facility. There may be a separate agent per fixture or the same agent may attend to two or more fixtures. The information for each agent may include the location of the agent, contact information for the agent, such as an electronic mail (e-mail) address, a telephone number of the agent, a street address of the agent, contact personnel at the agent, a zip code of the agent, and any other information that the agent wishes to provide.

In the fictitious example provided above, ABC Corporation may have contracted with agents to service, repair, replace, etc. fixtures at the various retail locations. The contracts may be based on the geographic location of each agent and each retail location. For example, an HVAC service in the Boston area may be contracted to service the HVAC system in the Boston location; a roofer in the New York area may be contracted to service the roof in the New York location, and so on. The same may be true for other fixtures of the various locations. In this regard, not all services may be required for all locations. For example, ABC Corporation may contract with a snow removal company in Boston to remove snow from the parking lot of its Boston location. However, this service will not typically be needed in the Los Angeles location and, therefore, there will be no corresponding contract. Database 55 may store, in association with each facility, identifying information each agent contracted for that facility, as noted above.

In addition, database 55 may store identities of one or more back-up agents for each facility. A back-up agent may be a secondary agent in the event that a primary agent for a particular fixture is unavailable. Contact information for one or more back-up agents for one or more fixtures may also be stored in association with an appropriate facility, along with conditions under with the back-up agent(s) are to be contacted.

Server 35 may track the performance of the agents for various facilities. For example, after an agent performs a service on a facility, the central authority may query the agent and/or the facility to confirm that the service was performed, how long it took, when it was performed, the quality of the service, etc. Server 35 may store this information in database 55 in association with each agent. This information may form the basis of report(s) that may be generated by server 35 to provide the company contracting with the agent(s) (or other (s)) information about their performance. The report(s) may be sent to computer(s) at the companies, where they may be displayed and viewed.

Database 55 may store information like that described above for numerous companies. Information for each company, such as that described above, may be updated, via a Web site hosted by server 35, by authorized representatives of each company, by authorized representatives of each facility, and/or by the central authority. The information for each company and its facilities may be only accessible to authorized personnel. Information for one company is not generally accessible to other companies.

Referring back to FIG. 5, each facility and agent may include one or more computers at their locations for communicating with server 35 over network 34. Additional hardware and/or software may be provided at each location. For example, instead of using a Web site to update database 55, computers at the various facilities may include a desktop application, which may be provided by the central authority for communication therewith. The desktop application may be configured to communicate with database 55 over network 34, and to update its contents as described herein.

Figure 6:
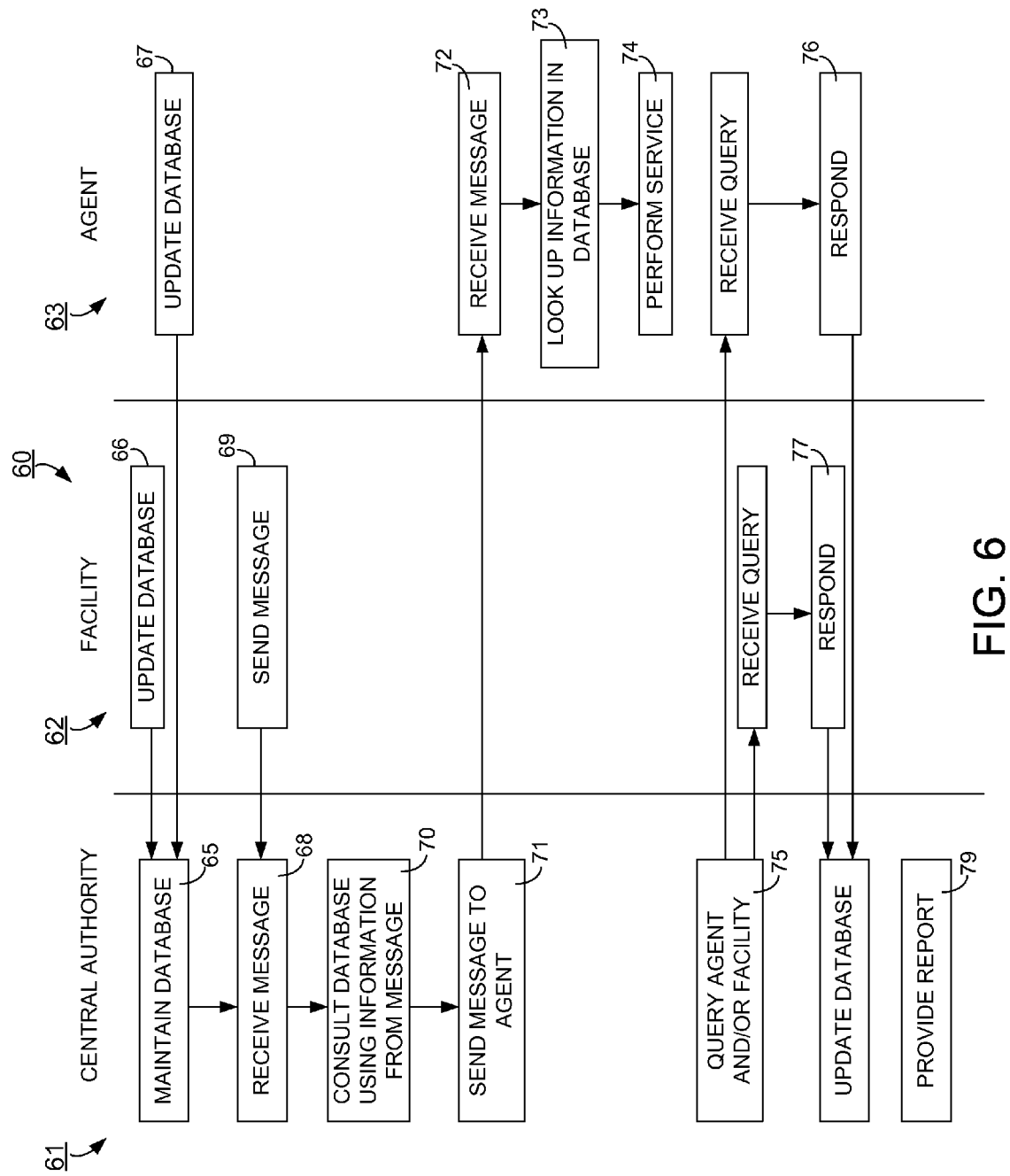
FIG. 6 is a flowchart showing actions that may be performed in the facilities management process depicted in FIGS. 1 to 4.

FIG. 6 is a flowchart showing a process 60. Process 60 may be performed, at least in part, by software running on server 35 to manage facilities in the system of FIG. 5. In FIG. 6, process 60 is split into a left part 61, which is performed on server 35; a middle part 62, which is performed on a computer at a facility (e.g., facility 30); and a right part 63, which is performed on a computer at an agent (e.g., agent 42). It is noted, however, that the actions shown in FIG. 6 may be assigned differently. For example, in other implementations, actions performed by server 35 may be performed at the facilities and/or agents, and actions performed at the facilities and/or agents may be performed at the server.

As shown in FIG. 6, central authority 37 maintains (65) database 55 via server 35. Database 55 may be constructed based on survey(s) of companies and their facilities and/or based on input provided electronically, e.g., via a Web site. Database 55 may likewise be updated (66, 67) as changes are made to its subjects. As noted, database updates may be obtained by surveying a facility and/or by receipt of updates provided electronically by the facility, its company, and/or associated agent(s).

Process 60 receives (68) a message from facility 30 (69). The message identifies the facility, e.g., by geography, company name, or any other information. In this implementation, the message is sent via a Web site hosted by server 35. That is, a user at facility 30 signs onto the Web site, and enters information relating to a fixture of the facility that requires attention. In alternative implementation, an electronic monitoring system may be employed to automatically identify fixtures that require attention. In such an implementation, the electronic monitoring system may communicate an appropriate message to server 35 automatically over network 34.

In response to receipt of the message from facility 30, process 60 consults (70) database 55 using information from the message. In this example, process 60 identifies a facility and fixture(s) that require attention from information in the message. Process 60 uses this information to look-up, in database 55, an agent that is contracted to service (or otherwise attend to) the fixture at the facility. In an example, process 60 uses the geographic location of the facility and the identity of the fixture to look-up the appropriate agent in database 55. Process 60 then sends (71) a message to agent 42. The message identifies the fixture and the facility that require attention. The message may also include other information, such as a suggested timetable for service. The message may be sent electronically (e.g., via e-mail) or via a post on a portal maintained by the agent for the company/facility whose fixtures are managed by the central authority. In an implementation, the message may be relayed, e.g., by phone, from an employee of the central authority to an employee at the agent.

Agent 42 receives (72) the message from process 60. If agent 42 is unable to perform the required service, or to do it within a time specified in the message or elsewhere, the agent may notify process 60. In that case, process 60 may consult the database for a secondary agent that is contracted to perform the service.

Assuming that agent 42 is able to perform the requested service, agent 42 proceeds with the service request. To this end, agent 42 identifies information about the facility and fixture(s) that require service by consulting database 55. That is, the agent may have access to database 55, e.g., through a secure Web site hosted by server 35. The agent may use the information provided in the message to obtain information about the facility and fixture(s). For example, agent 42 may log onto a Web site hosted by server 35 and, in conjunction with software stored on server 35, look-up (73) information relating to the facility and fixture(s) that is stored in the database. Agent 42 may obtain, from the database, information about the fixture including, e.g., one or more designations of the fixture (e.g., its part number, model number, manufacturer) and/or one or more characteristics of the fixture (e.g., its wattage, size, shape, color). For example, if an HVAC system in a facility in Boston requires repair, the agent contracted to service HVACs in Boston may identify the facility and the fixture that needs attention based on the message from the central authority. The agent may then look-up, in the database, the type, manufacturer, and identities of parts that make-up the HVAC system at the facility in Boston. By doing so, the agent is able to prepare itself to perform the service. For example, the agent can ensure that it has the correct parts, tools, and personnel to complete the service. In another example, if outdoor lighting at a facility in Los Angeles goes out, an agent contracted to service lighting at that facility in Los Angeles may consult the database to identify the type, wattage and, e.g., preferred manufacturer lighting for that facility.

Agent 42 services (74) the fixture based on the information obtained from the database. Thereafter, the agent 42 may confirm to process 60 that the service has been completed. Alternatively, the agent may respond to a query (75) issued by process 60 requesting confirmation that the service has been completed. In its response (76), if required, the agent may include other information, such as when the service was completed, the cost of the service, the amount of time it took to complete the service, etc. In another alternative, the query (75) may be sent to the facility at which service was performed instead of, or in addition to, the agent that performed the service. The facility may respond (77) to the query with information relating to the service performed by the agent. The facility may provide information similar to that provided by the agent, along with an indication of whether the agent performed the work satisfactorily. Database 55 may be updated (78) with information from agent 42 and/or facility 30 relating to the service that was performed by agent 42. The information may be associated with the agent, since it relates to the agent's performance. The information may also be stored on a per-service basis. That is, the database may include a record of each service, and associate that record to a facility, fixture, company, and/or agent that performed the service.

The operations performed at the central authority may be automatic, e.g., performed without the intervention of, or interaction with, a person. Alternatively, portion(s) of the operations performed at the central authority may be interactive.

A facility or company that owns the facility may request a report for a particular agent, facility or service. Process 60 may respond by consulting database 55, retrieving the appropriate information from database 55, formatting a report (or reports), and providing (79) the report for display, e.g., on a computer display peripheral, such as a liquid crystal display (LCD) screen. Reports such as these may be useful, e.g., to monitor the performance and cost of contracted agents, and to compare the performance and costs of various agents. Alternatively, statistical data relating, e.g., to cost, service time, responsiveness, and the like may be generated for various agents and made available by process 60 to companies considering employing those agents.

FIGS. 7 to 17 show examples of user interfaces (UIs) that may be generated by one or more computer programs (comprised of executable instructions) running on server 35 to implement at least part of process 60. These UIs may be accessible over network 34. For example, these UIs may be Web pages that are part of a Web site that is hosted by server 35 and that is accessible to company/facility personnel to perform various functions, including alerting the central authority about issues (e.g., problems) at a facility that require attention. These UIs may also be accessible to personnel at a central authority to perform facilities management, as described herein.

Figure 7:
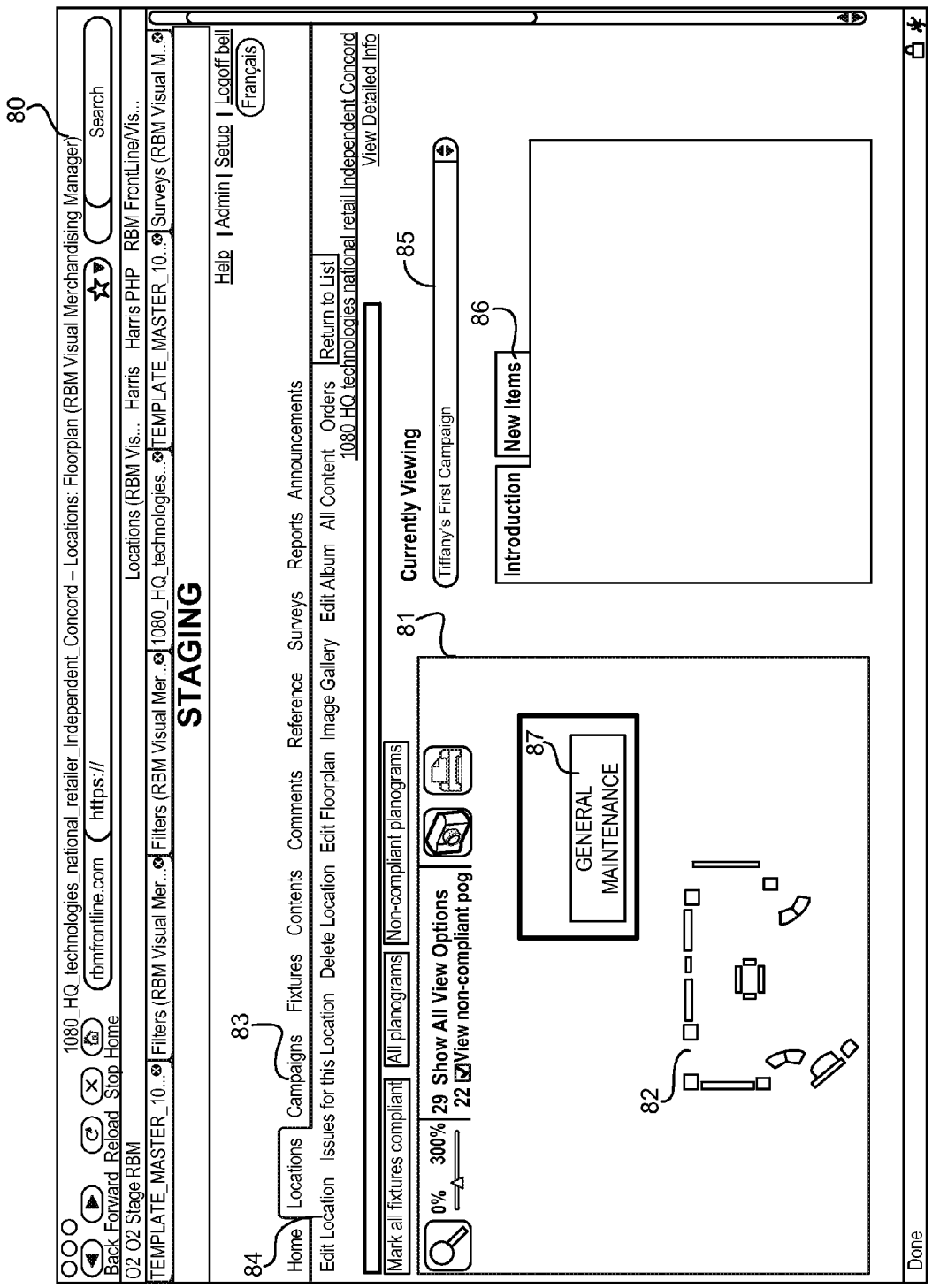

FIG. 7 shows a UI 80 that depicts staging 81 at a facility (e.g., facility 30). The UI of FIG. 7 may be accessible, e.g., to personnel at the central authority to view a facility. In this context, staging may include the layout or floor plan of fixtures at a facility. For example, FIG. 7 shows a floor plan 82 of a facility, which may be consulted to perform general maintenance on the facility. In this example, floor plan 82 shows the actual arrangement and locations of fixtures in a facility. These fixtures may include features such as display cases, furniture, and built-in or portable electronics. These fixtures may also include features, such as HVAC system equipment, lighting fixtures, and other systems that may require attention (e.g., service/maintenance/repair).

UI 80 includes options 83 to view different campaigns (e.g., advertising campaigns, for which fixtures are defined), individual fixtures, contents of a facility, comments by facility or central authority personnel, references, surveys of fixtures in a facility that may require attention, reports on a facility, and announcements, e.g., by the central authority. UI 80 also includes options 84 to edit the location of a subject facility; to identify issues associated with that facility (e.g., fixtures that require attention); to delete a current location of the facility; to edit floor plan 82, e.g., to change the layout of the floor plan; to view an image gallery showing, e.g., other floor plans or fixtures of those floor plans; to edit an album of floor plans; to view all content relating to the floor plan; to view orders relating to the floor plan, e.g., orders to service a fixture at the subject facility; and to return to a list of facilities. UI 80 includes a pull-down menu 85 to view the subject floor plan or others, and tabs 86 for introductions and new items. UI 80 also information relating to general maintenance to display maintenance issues for a fixture in the subject facility layout.

Figure 8:
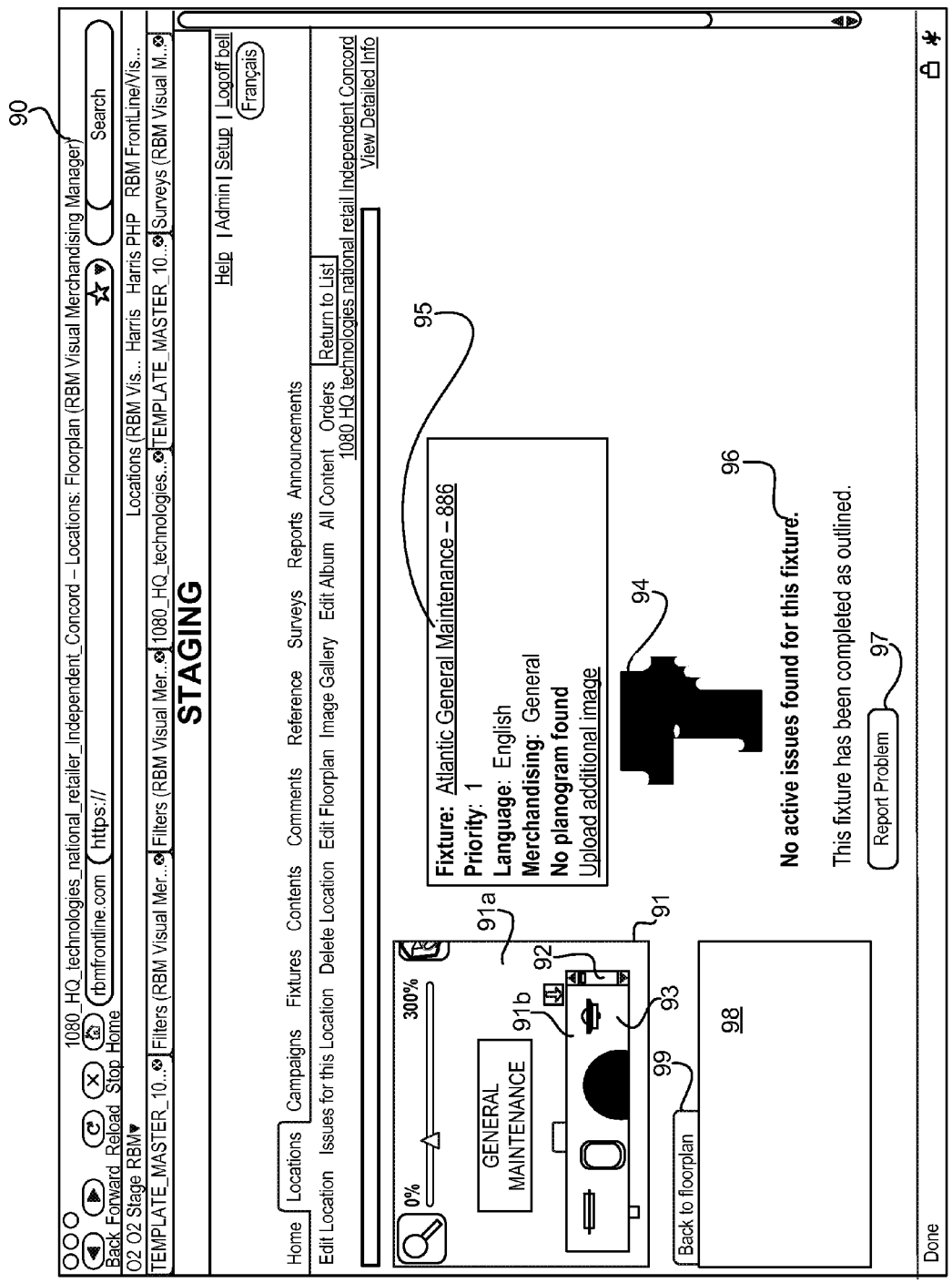

To report an issue/problem, one can just click on the "General Maintenance" tab 87 of FIG. 7, and the fixture will expand with additional text and a "Report Problem" button as shown in FIG. 8, which is described below.

FIG. 8 shows a UI 90 that is generated to view information about elements in the floorplan of FIG. 7. Selecting may be made through pointing and clicking via a mouse. Selecting the appropriate option causes display of general maintenance information 87 for a selected fixture of floor plan 82. More specifically, window 91 is generated. Window 91 is partitioned into two parts. A first part 91a includes an amplified ("zoomed") version of the original floor plan, with the general maintenance option 87 shown. A second part includes a window 91b and a scroll bar 92. Window 91b includes icons 93 corresponding to fixtures in floor plan 82. Selecting an icon causes display of an image 94 of the fixture that is represented by the selected icon, along with a summary 92 of information relating to the fixture. The UI may include information 95 identifying the fixture, information 96 on any issues with the fixture that require attention, and an option 97 to report a problem with the fixture that requires attention. Comments on the fixture, other than problem reports, may also be provided via window 98. Selecting option 99 brings a user back to the floor plan view shown in FIG. 7.

Figure 9:
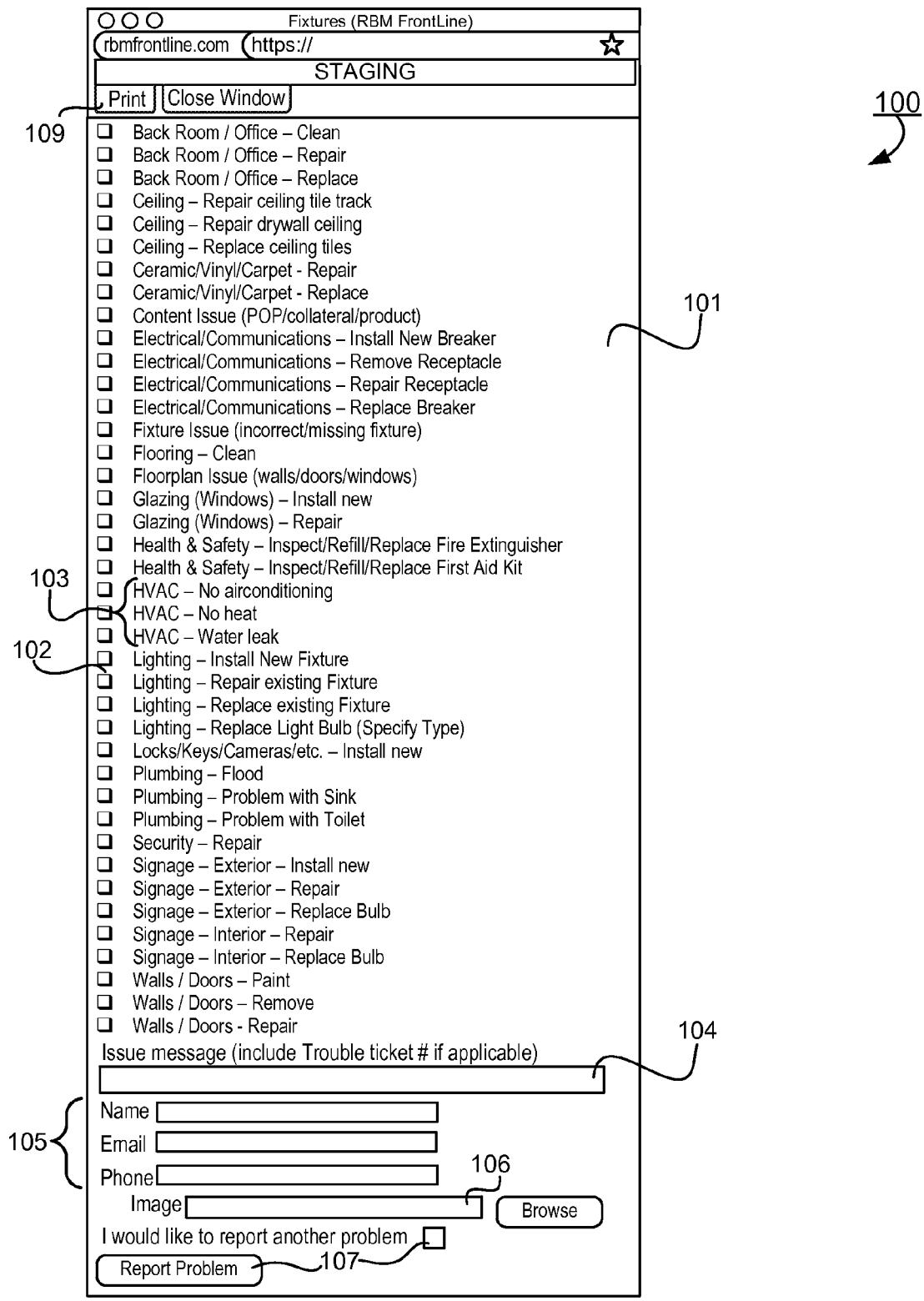

When one clicks on the "Report Problem" button 97 of FIG. 8, a list of potential issue/problems that can be reported on appears, as shown in FIG. 9. Note that to report an issue/problem, one selects one of the issue/problem categories, and then completes the additional information at the bottom of the form. Some of this data at bottom of the form, such as name and email, may be auto-filled from a user's login information.

More specifically, in an implementation, selecting option 97 to report a problem causes UI 100 (FIG. 9) to be displayed. UI 100 includes a customized (e.g., facility-specific) list 101 of fixtures in the facility including those in the floor plan shown in FIG. 7. In this regard, a facility may have more than one floor plan, with a different floor plan for each area of a room, room, building, etc. of the facility.

UI 100 includes radio buttons 102 next to corresponding fixtures in the facility. The fixtures listed are specific to the particular facility. In this implementation, associated with each fixture is a corresponding problem. Consequently, list 101 may include the same fixture multiple times—one for each potential problem. In this example, HVAC 103 is listed three times—once for the "no air conditioning" problem, once for the "no heat" problem, and once for the "water leak" problem. Other problems, which are not shown here, may also be included. Furthermore, fixtures may be listed without associated problems. Those problems may be added in the message field 104. Regardless of whether a selected fixture includes an associated problem, message field 104 provides a user with the opportunity to elaborate on a problem with a selected fixture and/or to provide additional identifying information for the fixture. Any information that one desires to communicate to the central authority may be included in message field 104.

UI 100 also includes fields 105 for identifying the name of a person or facility that is providing input to UI 100, a contact e-mail address, and a phone number. UI 100 also includes an option 106 to attach an electronic image of the fixture (or any other image). Upon selecting option 107, UI 100 generates an electronic message to central authority 37 based on the input provided, and sends that message over network 34. As explained above, process 60 running on server 35 at central authority uses the information provided, including, e.g., an identity of the facility and its location (which may be specified or inferred from, e.g., the phone number, name or address) to look-up, in database 55, an agent that can attend to the issue identified for the fixture, and to arrange for service with that agent. This process may be performed automatically, e.g., without further human interaction by personnel at the facility or at the central authority. In other implementations, confirmation from appropriate personnel at the facility and/or central authority may be requested and received. UI 100 also provides an option 107 to report another problem, and options 109 to print out the information provided and to close UI 100.

Figure 10:
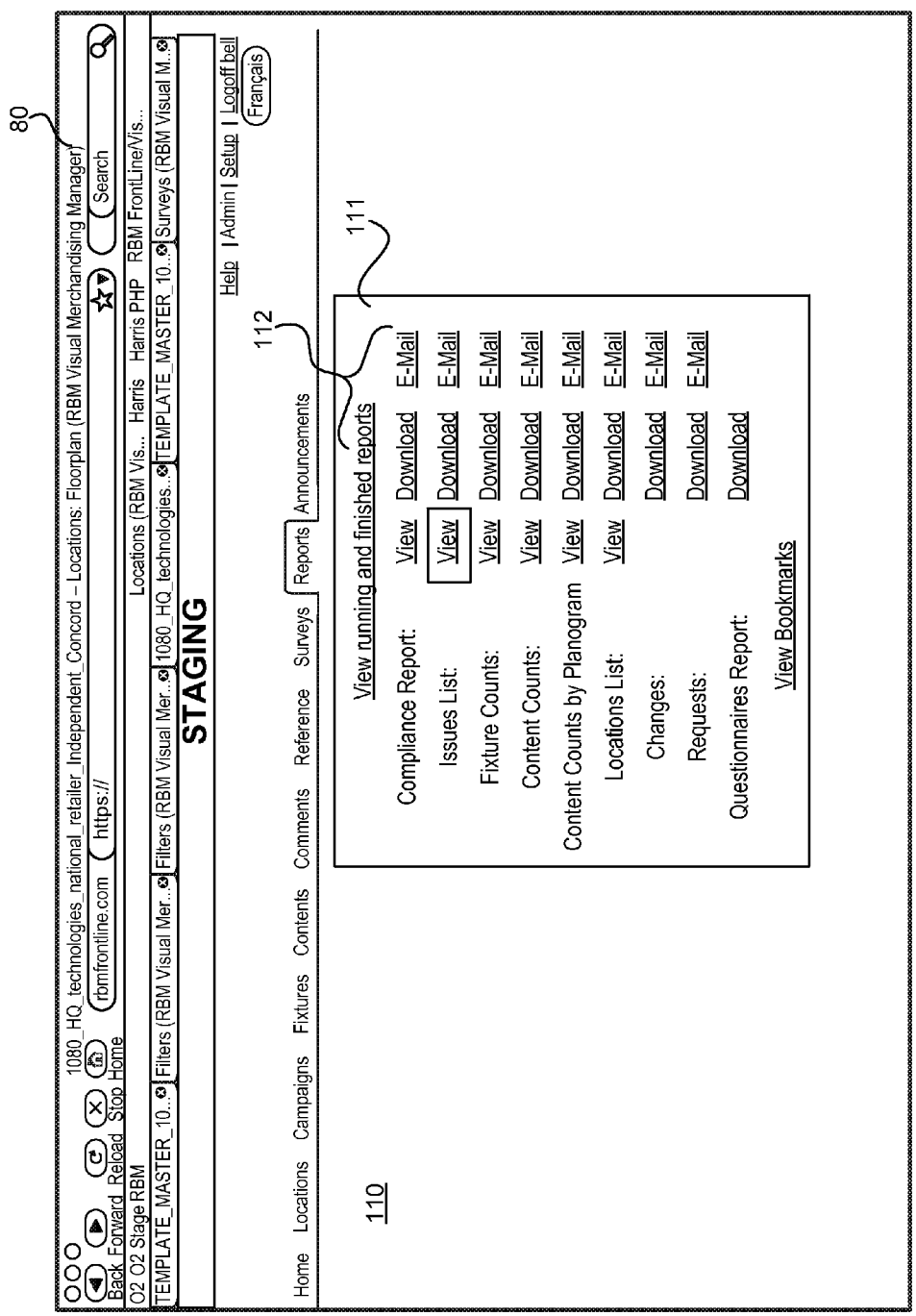

FIG. 10 is an example of a UI 110 that includes a report 111 that is generated from information retrieved from database 55. In this example, report 111 includes reports for the facility relating to compliance with requirements (e.g., of an advertising campaign, of scheduled maintenance, etc.), issues at the facility, fixture counts, content counts, content counts by planogram (e.g., a predefined fixture arrangement), locations list, changes, requests, and questionnaire reports. Report 111 also includes options 112 for viewing, downloading, and e-mailing report(s) to a specified e-mail address.

FIG. 11 is an example of a UI 114 that includes options 115 for selecting reports based on selections in a list, based on a type of merchandising, and issues in need of attention. UI 114 also allows a user to include issues that remain unresolved 116 and enables report(s) on issues to be sorted by comment 117.

FIG. 12 is an example of a UI 120 that enables access to reports generated from information in database 55. In this example, UI 120 includes a list of the fixtures 121, along with a report summary section 122. The report summary section 122 allows a user to obtain information about a particular issue, fixture or facility. In this example, report summary section 122 identifies, for a particular fixture, an issue 123 (e.g., a problem with a fixture), a service status 124 (e.g., "In Progress"), and a type 125, including an identity of the fixture and/or its location. A hyperlink 126 provides access to one or more pages containing detailed information in the report, such as the agent who is performing the service, or the like. A hyperlink 127 provides access to one or more pages describing the fixture, and a hyperlink 129 provides access to one or more pages describing fixtures and other information at a specific location (in this case, the location of the facility containing the fixture that requires service).

Figure 13:

FIG. 13 is an example of a UI 130 containing a detailed report for a fixture listed in the report summary section 122 of FIG. 12. After an issue has been reported, there will be a flashing yellow dot placed on the fixture to indicate that the "General Maintenance" fixture has at least one unresolved. An appropriately privilege user may remove the yellow dot and mark the issue/problem as resolved by clicking on the update issue status link 135 shown at the bottom of FIG. 12.

More specifically, FIG. 12 shows an identifier (ID) 131 of 30020 for a fixture/issue in report summary section 122. FIG. 13 shows a detailed report for ID 30020 that is generated in response to selecting hyperlink 126. The report contains the information shown there, along with a hyperlink 132 to one or more pages containing information about the facility and an option 134 to e-mail a person who identified the issue. UI 130 also contains a hyperlink 135 to one or more pages for updating the status of an issue associated with ID 30020. For example, an agent performing service, a manager at the central authority, and/or an authorized person at the facility or parent company may update the status. The central authority, at the instruction of the facility or the company that owns the facility, may designate who can update the issue status.

Figure 14:
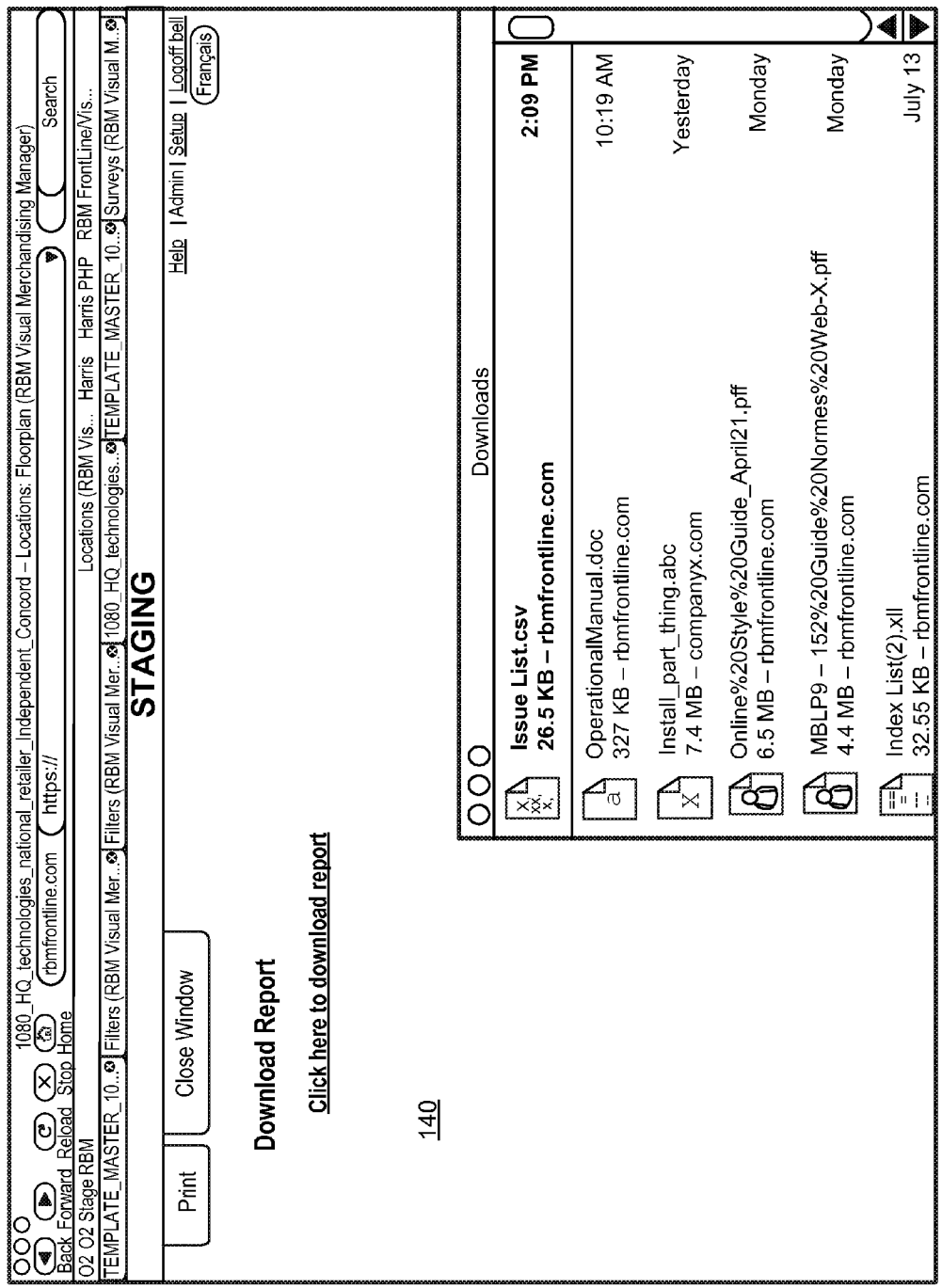

FIG. 14 is an example of a UI 140 allowing users to download one or more reports generated by process 60.

Figure 16:
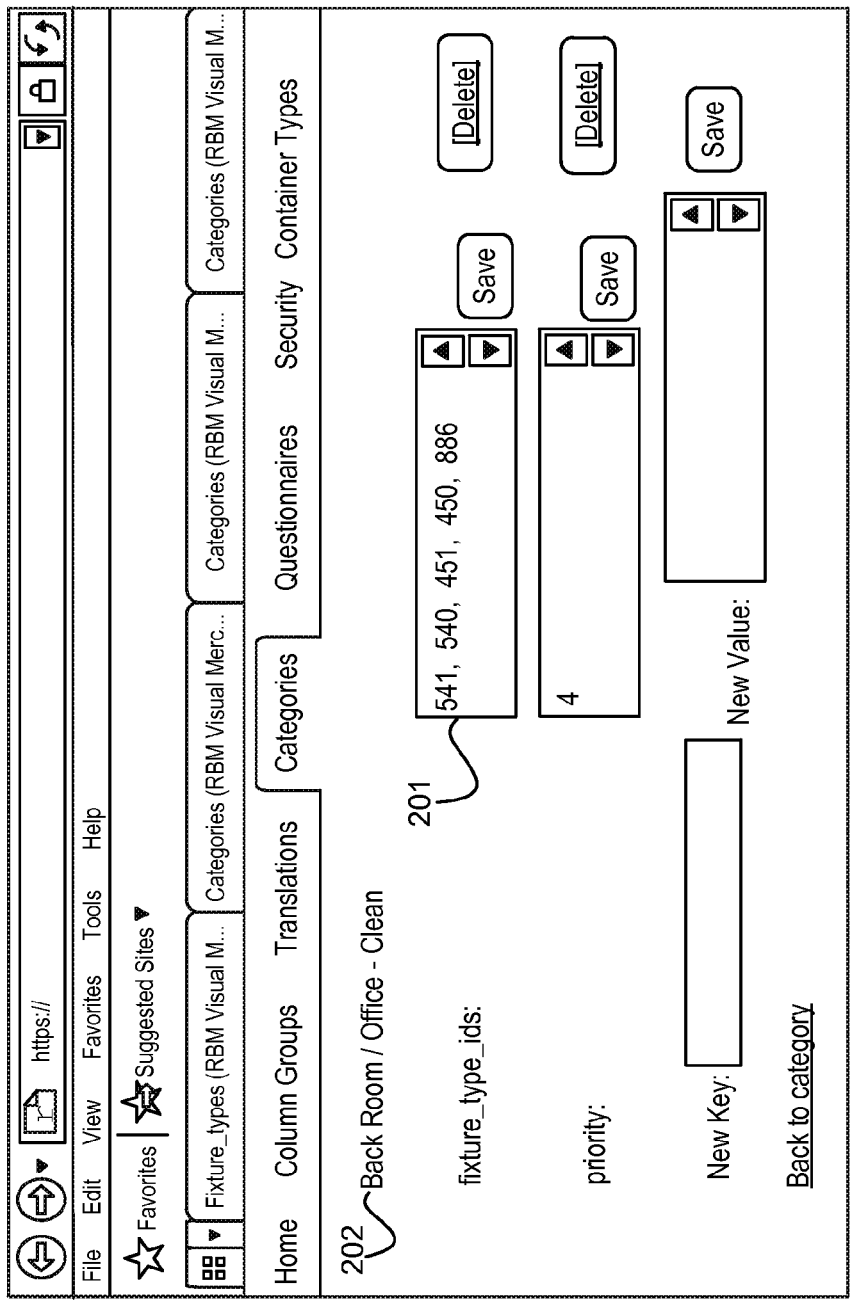
Figure 17:
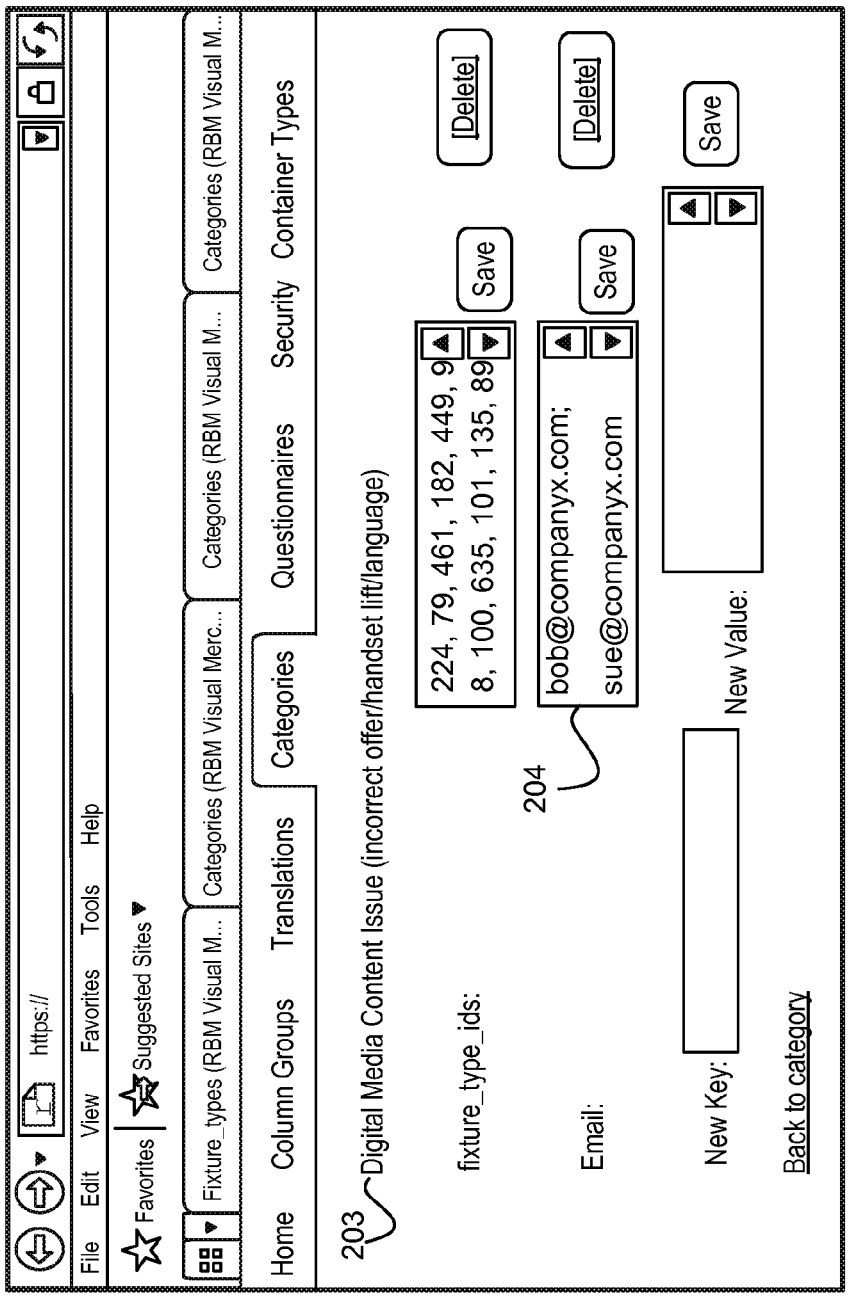

The system described herein also provides administrative features that may be implemented/performed, e.g., at the central authority or by an appropriate administrator. To set up an issue/problem reporting category for a "General Maintenance" fixture, it is first necessary to create the fixture itself. After a "General Maintenance" fixture has been set up, the next steps are to create any desired issue/problem categories and then associate these issue/problem categories with the fixture. For example, in FIG. 15, a user (e.g., an administrator) may click on "add a new category" feature 200 to create a new issue or problem category. In FIG. 16, a user may associate a fixture type 201 with a corresponding problem category 202. In FIG. 17 a user may associate one or more notifications 204 (e.g., e-mail notifications) with the problem category 203. The features of FIGS. 15 to 17 thus add, to the system, a fixture and possible problems with that fixture.

The system described herein for managing facilities may also include proactive alert mechanisms when certain scheduled events (e.g., warranty expiration dates) come within a specified number of days or weeks before the event is scheduled to occur. An alert (or reminder) may be a precursor to actually scheduling maintenance of a device or system in a facility. The alert may also act as a trigger for instructing an agent to perform a scheduled or unscheduled maintenance. Examples of types of events that the system is configured to monitor include, e.g., warranty expirations, scheduled maintenance calls, and planned retirement dates. For each of these alert classes, correct information should be pre-entered into the system for each equipment fixture or item to be covered. Examples of this information include, but are not limited to, warranty expiration dates, planned retirement dates, or last actual maintenance dates for annual, quarterly, or other scheduled maintenance. However, after the data is entered, the system automatically detects when these dates approach, and sends email alerts to specified parties. The system may also post alerts on a dashboard displaying floorplan of a facility, and cause the affected fixture items to flash visually on the displayed floorplan.

In an example, a system administrator may request that email alerts be sent eight weeks prior to the warranty expiration dates for any kitchen oven or dishwashing equipment. This enables such equipment to be reviewed and tested for problems prior to the warranty expiration date while any repairs and replacement items will be paid for the equipment manufacturer, potentially saving the administrator's company thousands of dollars in equipment repair costs. For simpler equipment, such as food preparation tables or dishware, this time horizon can be set to a shorter period, such as a week or two, since the review and testing of this simpler equipment may not take as long. All thresholds and email notifications may be set on individual instances of equipment (e.g. Serial No. 7856-JHZ of a Bruce SH200 Convection Oven), as well as at the equipment category level (e.g. all convection ovens). Warranty expiration, retirement, and last scheduled maintenance dates should be set on individual instances of equipment when the data for these instances is entered into the system, since these tend to be specific to individual equipment items and not equipment categories. Also, if the equipment item has multiple types of scheduled maintenance sessions, such as a quarterly check-up and tuning scheduled maintenance session as well as an annual parts inspection and replacement session, then the administrator may enter the last performed date for each type of maintenance session. When this is done, the system will not only activate all requested proactive alert mechanisms when scheduled dates approach, but it will also provide an additional notification that it may be possible to combine multiple maintenance sessions (e.g., a quarterly and an annual session) in one visit when these next scheduled session dates fall within a user-specified date range, such as within the same week.

The processes described herein extend issue/problem reporting and tracking capabilities beyond just the merchandising collateral issues to any conceivable and appropriate issue that can be reported at the store level, including issue/problems related to the physical plant, electrical or plumbing equipment, signage, staffing or other miscellaneous issues. A sample of those issues is shown in FIG. 9 above.

All or part of process 60 and its various modifications described herein (hereinafter referred to as "the processes") can be implemented, at least in part, via a computer program product, i.e., a computer program tangibly embodied in one or more information carriers, e.g., in one or more tangible, non-transitory machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions described herein. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

Reports and other information that are generated by process 60 may be displayed on a computer peripheral (e.g., a monitor) associated with a computer, e.g., at a company at a facility, at an agent, at the central authority, or elsewhere. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, as indicated above, the display of a report on a computer peripheral is tied to a particular machine, namely, the computer peripheral.

The processes described herein are not limited to use with the system shown in FIG. 5, and may be implemented on any appropriate system. The processes are not limited to use in the context of service/repair/replacement. For example, the processes may be used to replenish missing or low stock at a retail outlet. For example, the "issue" at a particular facility may be low stock (e.g., a store has run out of canned soda). The facility may alert the central authority, which may communicate to an agent who is contracted to supply the stock—in this case, canned soda—to the facility. The process may be automatic, as described above, or it may include human intervention (e.g., to confirm that the new stock is actually needed).

The processes are not limited to use in a retail context. For example, the processes may be used to provide service/repair/replacement for medical facilities, such as hospitals. In this regard, hospital equipment can require periodic servicing and/or maintenance to comply with government regulations. The processes may be used to schedule such servicing and/or maintenance to ensure such compliance.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method performed by one or more servers, the method comprising:
   maintaining a database comprising information relating to facilities that are subject to a first entity, the facilities being dispersed geographically, the information comprising geographic locations for at least some of the facilities;
   outputting data for a user interface, the user interface comprising a layout of a facility for which information is in the database, the layout comprising representations of fixtures arranged as at the facility, each of the fixtures being selectable to identify one or more predefined selectable issues that can be part of a message for maintenance or repair;
   receiving, via the user interface, a first message from the facility, the first message identifying a fixture that is part of the facility and that requires maintenance or repair and identifying one or more of the predefined selectable issues, wherein information in the database for the facility identifies the fixture by at least one of a designation of the fixture or a characteristic of the fixture;
   sending a second message to a second entity that has contracted with the first entity to provide service within a geographic location of the facility;
   enabling the second entity to access the database to identify the fixture and to obtain information from the database to perform the maintenance or repair on the fixture, wherein enabling the second entity to access the database comprises hosting a portal configured to enable the second entity to access the database, wherein the portal comprises a Web page, and wherein the Web page comprises a security feature to restrict access to the database; and
   compiling statistics on the second entity and making the statistics available for access by third parties over a computer network;
   wherein the one or more servers comprise one or more processing devices programmed to perform the maintaining, the outputting, the receiving, the sending, the enabling, and the compiling.

2. The method of claim 1, further comprising:
   receiving a communication from the second entity, the communication for accessing the database to identify the fixture.

3. The method of claim 1, wherein the information in the database for the facility identifies the fixture by both a designation of the fixture and a characteristic of the fixture.

4. The method of claim 3, wherein the designation comprises a part number and the characteristic comprises a functionality associated with the fixture.

5. The method of claim 1, further comprising:
   sending a third message to the first entity, the third message for confirming that the second entity provided the attention to the fixture.

6. The method of claim 1, wherein the database further comprises information relating to entities that have contracted with the first entity to provide services for the facilities; and
   wherein the method comprises:
      generating a report based on the information relating to the entities, the report organizing the information relating to the entities; and
      providing the report to the first entity.

7. The method of claim 6, wherein the information relating to the entities comprises at least one of responsiveness of the entities, costs of the entities, or capabilities of the entities.

8. The method of claim 1, wherein, prior to receiving the first message, the method further comprises:
   sending a reminder to the facility regarding an upcoming event associated with the fixture.

9. One or more non-transitory machine-readable media storing instructions that are executable by one or more servers to perform operations comprising:
   maintaining a database comprising information relating to facilities that are subject to a first entity, the facilities being dispersed geographically, the information comprising geographic locations for at least some of the facilities;
   outputting data for a user interface, the user interface comprising a layout of a facility for which information is in the database, the layout comprising representations of fixtures arranged as at the facility, each of the fixtures being selectable to identify one or more predefined selectable issues that can be part of a message for maintenance or repair;
   receiving, via the user interface, a first message from the facility, the first message identifying a fixture that is part of the facility and that requires maintenance or repair and identifying one or more of the predefined selectable issues, wherein information in the database for the facility identifies the fixture by at least one of a designation of the fixture or a characteristic of the fixture;

sending a second message to a second entity that has contracted with the first entity to provide service within a geographic location of the facility;

enabling the second entity to access the database to identify the fixture and to obtain information from the database to perform the maintenance or repair on the fixture, wherein enabling the second entity to access the database comprises hosting a portal configured to enable the second entity to access the database, wherein the portal comprises a Web page, and wherein the Web page comprises a security feature to restrict access to the database; and compiling statistics on the second entity and making the statistics available for access by third parties over a computer network.

10. The one or more non-transitory machine-readable media of claim 9, wherein the operations further comprise:

receiving a communication from the second entity, the communication for accessing the database to identify the fixture.

11. The one or more non-transitory machine-readable media of claim 9, wherein the information in the database for the facility identifies the fixture by both a designation of the fixture and a characteristic of the fixture.

12. The one or more non-transitory machine-readable media of claim 11, wherein the designation comprises a part number and the characteristic comprises a functionality associated with the fixture.

13. The one or more non-transitory machine-readable media of claim 11, wherein the operations further comprise, prior to receiving the first message:

sending a reminder to the facility regarding an upcoming event associated with the fixture.

14. The one or more non-transitory machine-readable media of claim 9, wherein the operations further comprise:

sending a third message to the first entity, the third message for confirming that the second entity provided the attention to the fixture.

15. The one or more non-transitory machine-readable media of claim 9, wherein the database further comprises information relating to entities that have contracted with the first entity to provide services for the facilities; and wherein the operations further comprise:

generating a report based on the information relating to the entities, the report organizing the information relating to the entities; and providing the report to the first entity.

16. The one or more non-transitory machine-readable media of claim 15, wherein the information relating to the entities comprises at least one of responsiveness of the entities, costs of the entities, or capabilities of the entities.

17. One or more servers comprising:

one or more processing devices configured to execute instructions to perform operations comprising:

maintaining a database comprising information relating to facilities that are subject to a first entity, the facilities being dispersed geographically, the information comprising geographic locations for at least some of the facilities;

outputting data for a user interface, the user interface comprising a layout of a facility for which information is in the database, the layout comprising representations of fixtures arranged as at the facility, each of the fixtures being selectable to identify one or more predefined selectable issues that can be part of a message for maintenance or repair;

receiving, via the user interface, a first message from the facility, the first message identifying a fixture that is part of the facility and that requires maintenance or repair and identifying one or more of the predefined selectable issues, wherein information in the database for the facility identifies the fixture by at least one of a designation of the fixture or a characteristic of the fixture;

sending a second message to a second entity that has contracted with the first entity to provide service within a geographic location of the facility;

enabling the second entity to access the database to identify the fixture and to obtain information from the database to perform the maintenance or repair on the fixture, wherein enabling the second entity to access the database comprises hosting a portal configured to enable the second entity to access the database, wherein the portal comprises a Web page, and wherein the Web page comprises a security feature to restrict access to the database; and compiling statistics on the second entity and making the statistics available for access by third parties over a computer network.

18. The one or more servers of claim 17, wherein the operations further comprise:

receiving a communication from the second entity, the communication for accessing the database to identify the fixture.

19. The one or more servers of claim 17, wherein the information in the database for the facility identifies the fixture by both a designation of the fixture and a characteristic of the fixture.

20. The one or more servers of claim 19, wherein the designation comprises a part number and the characteristic comprises a functionality associated with the fixture.

21. The one or more servers of claim 17, wherein the operations further comprise:

sending a third message to the first entity, the third message for confirming that the second entity provided the attention to the fixture.

22. The one or more servers of claim 17, wherein the database further comprises information relating to entities that have contracted with the first entity to provide services for the facilities; and wherein the operations further comprise:

generating a report based on the information relating to the entities, the report organizing the information relating to the entities; and providing the report to the first entity.

23. The one or more servers of claim 22, wherein the information relating to the entities comprises at least one of responsiveness of the entities, costs of the entities, or capabilities of the entities.

24. The one or more servers of claim 17, wherein the operations further comprise, prior to receiving the first message:

sending a reminder to the facility regarding an upcoming event associated with the fixture.

* * * * *